United States Patent Office 3,504,009
Patented Mar. 31, 1970

3,504,009
PREPARATION OF THIOLCARBOXYLATES
Robert A. Dombro, Chicago, Ill., assignor to Universal Oil Products Company, Des Plaines, Ill., a corporation of Delaware
No Drawing. Filed May 8, 1967, Ser. No. 636,624
Int. Cl. C07c 153/07
U.S. Cl. 260—455     8 Claims

ABSTRACT OF THE DISCLOSURE

Thiolcarboxylates, and particularly aralkyl thiolcarboxylates are prepared by treating an arakyl mercaptan with an alkyl alcohol and a dialkyl sufoxide in an aqueous alkali medium at an elevated temperature and pressure to prepare an arylalkyl thiolcarboxylate.

---

This invention relates to a process for the preparation of thiolcarboxylates and particularly aralkyl thiolcarboxylates. More specifically, the invention is concerned with a process for treating a thiol of a type hereinafter set forth in greater detail with an alcohol and an oxidant in an alkali medium to prepare the desired product.

The products which are prepared according to the process of this invention, namely, aralkyl thiolcarboxylates will find a use in the chemical field as an intermediate for obtaining aralkyl alcohols containing a predetermined number of carbon atoms in the side chain and in addition having the —OH group on a predetermined carbon site. For example, it is possible to prepare a thiolcarboxylate and thereafter hydrolyze said ester to obtain 2-phenylethyl mercaptan, said mercaptan can then be converted to di-2-phenylethyl disulfide with an oxidizing agent and finally to 2-phenylethyl alcohol by hydrolysis with alkali, said alcohol being useful in the preparation of aroma compositions which in turn may be used in cosmetics, detergents, soaps, talcs, perfumes, colognes, etc.

It is therefore an object of this invention to prepare thiolcarboxylates utilizing a sulfur-containing compound as a starting material.

A further object of this invention is to prepare thiolcarboxylates which may be used as intermediates in the preparation of alcohols containing a predetermined number of carbon atoms and having the —OH group in a predetermined position on the chain.

One embodiment of this invention resides in a process for the preparation of an aralkyl thiolcarboxylate of the formula.

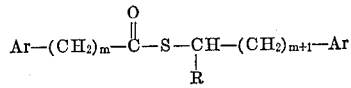

where Ar is phenyl, R is hydrogen or lower alkyl of one less carbon atom than the hereinafter specified alcohol, and $m$ is an integer of 0 to about 7, which comprises reacting, in an aqueous alkali medium at a temperature of about 100° to about 200° C. and a pressure of about 1 to about 100 atmospheres, an aralkyl mercaptan of the formula

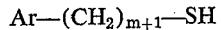

where Ar and $m$ as are above defined, with a lower alkyl alcohol and a di-lower alkyl sulfoxide, the alkyl radicals of said alcohol and of said sulfoxide being of identical configuration, and recovering the resultant aralkyl thiolcarboxylate.

A specific embodiment of this invention is found in a process for preparing an aralkyl thiolcarboxylate which comprises treating benzyl mercaptan with methyl alcohol and dimethyl sulfoxide in an aqueous potassium hydroxide solution at a temperature in the range of from about 100° to about 200° C. and a pressure in the range of from about atmospheric to about 100 atmospheres, and recovering the resultant 2-phenylethyl thiolbenzoate.

Other objects and embodiments will be found in the following further detailed description of this invention.

As hereinbefore set forth, the present invention relates to a process for preparing thiolcarboxylates and particularly aralkyl thiolcarboxylates which may be used as intermediates in the preparation of useful chemical compounds such as aralkyl alcohols in which the —OH group is on a specific, predetermined carbon atom. The compounds are prepared by treating aralkyl mercaptans with an oxidant, preferably a dialkyl sulfoxide and an alkanol in an aqueous alkali medium. As hereinbefore set forth in greater detail, the alkyl portion of the sulfoxide and the alkyl radical of the alcohol preferably must be of identical configuration, that is, they must both contain the same number of carbon atoms in the same straight chain or branched-chain form. Examples of starting materials which may be utilized in the process of the present invention comprise aralkyl mercaptans. Some specific examples of these compounds will include aralkyl mercaptans such as benzyl mercaptan, 2-phenylethyl mercaptan, 3-phenylpropyl mercaptan, 4-phenylbutyl mercaptan, 5-phenylpentyl mercaptan, 6-phenylhexyl mercaptan, 7-phenylheptyl mercaptan, 8-phenyloctyl mercaptan, etc. While the aforementioned examples only represent straight chain aralkyl mercaptans it is also contemplated within the scope of this invention that mercaptans containing branched chain alkyl radicals may also be used, such as, for example, 2-phenyl-2-methylethyl mercaptan, 3-phenyl-3-methylpropyl mercaptan, 2-methyl-3-phenylpropyl mercaptan, etc.

The aforementioned aralkyl mercaptans are treated with an oxidant and an alcohol in the presence of an aqueous alkali medium. As hereinbefore set forth, the preferred oxidant comprises a dialkyl sulfoxide, along with an aliphatic alcohol in which the alkyl radical of the alcohol is of an identical configuration with the alkyl radical of the sulfoxide. By utilizing this treating manner, it is possible to vary the side-chain of the ester in any manner as so desired, thereby permitting, upon hydrolysis of the ester, the placement of an —SH radical at any desired position on the chain. This mercaptan thus produced may be converted to an alcohol by first converting it to a disulfide followed by hydrolysis of the disulfide with alcoholic caustic at elevated temperatures. Examples of dialkyl sulfoxides and aliphatic alcohols which may be used include dimethyl sulfoxide, diethyl sulfoxide, di-n-propyl sulfoxide, diisopropyl sulfoxide, di-n-butyl sulfoxide, di-t-butyl sulfoxide, the isomeric dipentyl, dihexyl, diheptyl, dioctyl, etc., sulfoxides. Examples of aliphatic alcohols which may be used include methyl alcohol, ethyl alcohol, propyl alcohol, isopropyl alcohol, n-butyl alcohol, t-butyl alcohol, the isomeric pentyl, hexyl, heptyl, etc., alcohols.

The preparation of the aralkyl thiolcarboxylates is effected at elevated temperatures and pressures including temperatures in the range of from about 100° to about 200° C. and under an implied pressure of from about 2 to about 100 atmospheres. The pressure is effected by charging an inert gas such as nitrogen to the reaction vessel in an amount sufficient to maintain a major portion of the reactants in the liquid phase. In addition, the reaction is effected in an aqueous alkali medium. Examples of alkali mediums which may be used include aqueous solutions of the alkali metal hydroxides such as sodium hydroxide, potassium hydroxide, lithium hydroxide, rubidium hydroxide and cesium hydroxide, alkaline earth metal hydroxides such as magnesium hydroxide, calcium hydroxide, strontium hydroxide and barium hydroxide.

The process of this invention may be effected in any suitable manner and may comprise either a batch or continuous type operation. For example, when a batch type operation is used, a quantity of the starting materials comprising the arylalkyl mercaptan is placed in an appropriate apparatus such as, for example, a rotating autoclave. In addition, the oxidant comprising the alkyl sulfoxide and the aliphatic alcohol of the type hereinbefore set forth in greater detail are placed in the autoclave along with the alkali metal or alkaline earth metal compound in aqueous form which provides the alkali medium. The autoclave is sealed and the nitrogen is pressed in until the desired pressure has been reached. Following this, the autoclave and contents thereof are heated to the desired temperature and maintained thereat for a predetermined residence time, the duration of said residence time being from about 1 to about 10 hours in length. At the end of this time, the autoclave and contents thereof are allowed to cool to room temperature, the excess pressure is vented and the reaction mixture is recovered. The organic portion of the mixture is separated from the aqueous alkali medium, washed with water, neutralized and dried. The desired product comprising the aralkyl thiolcarboxylate is separated and recovered from any unreacted starting materials by conventional means such as fractional distillation, crystallization, etc.

It is also contemplated within the scope of this invention that the process may be effected in a continuous manner of operation. When such a type of operation is used, a quantity of the aralkyl mercaptan is continuously charged to the reaction zone which is maintained at the proper operating conditions of temperature and pressure. In addition, the oxidant and alcohol of the type hereinbefore set forth in greater detail will also be continuously charged to the reaction zone, as is the aqueous alkali medium. The oxidant and the alcohol may be charged to the reactor through separate lines and if so desired they may be admixed prior to entry into said reactor and said reactants are charged thereto in a single stream. Upon completion of the desired residence time, the reactor effluent is continuously withdrawn, following which the aqueous alkali medium is separated from the organic layer of the effluent. This organic layer is then further treated so as to separate the desired aralkyl thiolcarboxylate from the unreacted mercaptan and oxidant-alcohol mixture, these latter two compounds being recycled to the reactor to form a portion of the feed stock while the aralkyl thiolcarboxylate is recovered.

Examples of aralkyl thiolcarboxylates which may be prepared according to the process of this invention include 2-phenylethyl thiolbenzoate, 3-phenylpropyl-α-phenylthiolacetate, 4-phenylbutyl-α-phenylthiolacetate, 1-methyl-4-phenylbutyl-α-phenylthiolpropionate, 1-methyl-4-phenylbutyl-β-phenylthiolpropionate, etc. It is to be understood that the aforementioned compounds are only representative of the class of compounds which may be prepared and that the present invention is not necessarily limited thereto.

The following examples are given to illustrate the process of the present invention which, however are not intended to limit the generally broad scope of the present invention in strict accordance therewith.

EXAMPLE I

In this example, 59.5 g. (0.54 mole) of benzyl mercaptan, 56 g. (1.0 mole) of potassium hydroxide, 54.6 g. (0.7 mole) of dimethyl sulfoxide along with 150 cc. of methyl alcohol and 50 cc. of water were placed in the glass liner of a rotating autoclave. The autoclave was sealed and nitrogen pressed in until an initial pressure of 30 atmospheres was reached. The autoclave was heated from 100° to about 200° C. during a period of about 5 hours. At the end of this time, the autoclave and contents thereof were allowed to cool to room temperature. The autoclave was vented and the reaction product was recovered. The organic layer was separated from the water layer, washed with water and dried. The product was subjected to analysis and found to contain 2-phenylethyl thiolbenzoate.

EXAMPLE II

In this experiment, a mixture of 0.5 mole of 3-phenylpropyl mercaptan, 0.7 mole of dimethyl sulfoxide, 1.0 mole of potassium hydroxide along with 150 cc. of methyl alcohol and 50 cc. of water is placed in the glass liner of a rotating autoclave. The autoclave is sealed and nitrogen pressed in until an initial pressure of 30 atmospheres is reached. The autoclave is then heated to a temperature of about 150° C. and maintained in a range of from about 150° C. to about 200° C. for a period of about 5 hours. At the end of this time, the autoclave and contents thereof are allowed to return to room temperature. The autoclave is vented to remove any excess pressure and the reaction product is recovered. The organic layer is separated from the aqueous alkali layer, washed, neutralized and dried. Analysis of the product will disclose the presence of 4-phenylbutyl-β-phenylthiolpropionate.

EXAMPLE III

A mixture of 0.5 mole of 3-phenylpropyl mercaptan, 1.5 mole of sodium hydroxide, 1.0 mole of diethyl sulfoxide, along with 150 cc. of ethyl alcohol and 50 cc. of water is placed in the glass liner of a rotating autoclave and treated in a manner similar to that set forth in the above examples. Upon completion of the desired residence time of about 5 hours' duration, the autoclave and contents thereof are allowed to cool to room temperature and vented to remove excess pressure. The reaction product is recovered and the organic layer is separated from the aqueous alkali layer. After recovery steps, the product, upon analysis, will be shown to contain 1-methyl-4-phenylbutyl-β-phenylthiolpropionate.

I claim as my invention:

1. A process for the preparation of an aralkyl thiolcarboxylate of the formula

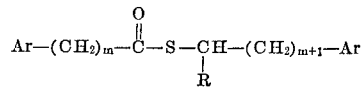

where Ar is phenyl, R is hydrogen or lower alkyl of one less carbon atom than the hereinafter specified alcohol, and $m$ is an integer of 0 to about 7, which comprises reacting, in an aqueous alkali medium at a temperature of about 100° to about 200° C. and a pressure of about 1 to about 100 atmospheres, an aralkyl mercaptan of the formula

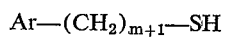

where Ar and $m$ are as above defined, with a lower alkyl alcohol and a di-lower alkyl sulfoxide, the alkyl radicals of said alcohol and of said sulfoxide being of identical configuration, and recovering the resultant aralkyl thiolcarboxylate.

2. The process as set forth in claim 1, further characterized in that said alkyl alcohol is propyl alcohol and said dialkyl sulfoxide is dipropyl sulfoxide.

3. The process as set forth in claim 1, further characterized in that said alkyl alcohol is butyl alcohol and said dialkyl sulfoxide is dibutyl sulfoxide.

4. The process as set forth in claim 1, further characterized in that said alkyl alcohol is methyl alcohol and said dialkyl sulfoxide is dimethyl sulfoxide.

5. The process as set forth in claim 4, further characterized in that said aralkyl mercaptan is benzyl mercaptan and said aralkyl thiolcarboxylate is 2-phenylethyl thiolbenzoate.

6. The process as set forth in claim 4, further characterized in that said aralkyl mercaptan is 3-phenylpropyl mercaptan and said aralkyl thiolcarboxylate is 4-phenyl-butyl-β-phenylthiolpropionate.

7. The process as set forth in claim 1, further characterized in that said alkyl alcohol is ethyl alcohol and said dialkyl sulfoxide is diethyl sulfoxide.

8. The process as set forth in claim 7, further characterized in that said aralkyl mercaptan is 3-phenylpropyl mercaptan and said aralkyl thiolcarboxylate is 1-methyl-4-phenylbutyl-β-phenylthiolpropionate.

References Cited

Kharasch et al.: "Quarterly Reports on Sulfur Chemistry," vol. 1, No. 1, p. 28.

CHARLES B. PARKER, Primary Examiner

D. R. PHILLIPS, Assistant Examiner